(12) United States Patent
Hu et al.

(10) Patent No.: US 10,810,298 B2
(45) Date of Patent: Oct. 20, 2020

(54) PASSWORD SPYING PROTECTION SYSTEM

(71) Applicant: eBay Inc., San Jose, CA (US)

(72) Inventors: Yue Hu, Shanghai (CN); Yang Cao, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/769,276

(22) PCT Filed: Oct. 19, 2015

(86) PCT No.: PCT/CN2015/092228
§ 371 (c)(1),
(2) Date: Apr. 18, 2018

(87) PCT Pub. No.: WO2017/066914
PCT Pub. Date: Apr. 27, 2017

(65) Prior Publication Data
US 2018/0307822 A1     Oct. 25, 2018

(51) Int. Cl.
*G06F 21/36* (2013.01)
*G06F 3/044* (2006.01)
(Continued)

(52) U.S. Cl.
CPC .............. *G06F 21/36* (2013.01); *G06F 3/044* (2013.01); *G06F 3/04842* (2013.01); *G06F 21/45* (2013.01); *H04L 9/3226* (2013.01)

(58) Field of Classification Search
CPC ...................................................... G06F 21/36
See application file for complete search history.

(56) References Cited

U.S. PATENT DOCUMENTS 5,428,349 A * 6/1995 Baker ............... G06Q 20/382
235/382.5
6,246,769 B1 * 6/2001 Kohut ............... G06Q 20/341
380/45
(Continued)

FOREIGN PATENT DOCUMENTS

CN     102265650 A     11/2011
CN     103039063 A     4/2013
(Continued)

OTHER PUBLICATIONS

Chen et al. A Simple Text-Based Shoulder Surfing Resistant Graphical Password Scheme Feb. 25-26, 2013 2013 International Symposium on Next-Generation Electronics (Year: 2013).*
(Continued)

*Primary Examiner* — David J Pearson
(74) *Attorney, Agent, or Firm* — Shook, Hardy & Bacon LLP

(57) ABSTRACT

In example embodiments, a first pattern of characters is displayed on a user interface of a user device. A user input is received and the first pattern of characters is replaced by a second pattern of characters. The user input is a selection of one of the characters from the pattern of characters. Each character is encrypted by a password selection rule (e.g., assign to a character selection the value of the character adjacent in a clockwise, counterclockwise, or diagonal direction from the selected character). After all user inputs are received determined from the password selection rule, an input password is generated. The generated input password is compared to a stored password designation to determine whether the input password matches the stored password designation. If the input password matches the stored password designation, the user is authorized to have access to the user device.

17 Claims, 11 Drawing Sheets

(51) Int. Cl.
  *G06F 3/0484* (2013.01)
  *G06F 21/45* (2013.01)
  *H04L 9/32* (2006.01)

(56) References Cited

U.S. PATENT DOCUMENTS

| | | | |
|---|---|---|---|
| 7,484,173 | B2 | 1/2009 | Gao et al. |
| 2003/0210127 | A1* | 11/2003 | Anderson ............... G06F 21/36 340/5.27 |
| 2005/0139658 | A1* | 6/2005 | Lambert ............... G06F 21/31 235/382.5 |
| 2006/0020815 | A1* | 1/2006 | Varghese ............... G06F 21/36 713/182 |
| 2007/0250934 | A1 | 10/2007 | Park |
| 2009/0037986 | A1 | 2/2009 | Baker |
| 2010/0073126 | A1* | 3/2010 | Morin .................. G06F 21/36 340/5.2 |
| 2011/0004928 | A1* | 1/2011 | Won ..................... G06F 21/36 726/7 |
| 2012/0252410 | A1 | 10/2012 | Williams |
| 2013/0276102 | A1 | 10/2013 | Rautenbach et al. |
| 2015/0172273 | A1 | 6/2015 | Dong et al. |
| 2015/0235024 | A1* | 8/2015 | Corrion ................ G06F 21/31 726/18 |

FOREIGN PATENT DOCUMENTS

| | | |
|---|---|---|
| CN | 108351931 A | 7/2018 |
| WO | 2006081593 A1 | 3/2006 |
| WO | 2014009725 A1 | 1/2014 |
| WO | 2017066914 A | 4/2017 |

OTHER PUBLICATIONS

Chen et al. A simple text-based shoulder surfing resistant graphical password schemeIEEE2013 International Symposium on Next-Generation Electronics (Year: 2013).*
Gao et al. Analysis and Evaluation of the ColorLogin Graphical Password SchemeIEEE2009 Fifth International Conference on Image and Graphics (Year: 2009).*
Shi et al. A PIN Entry Scheme Resistant to Recording-Based Shoulder-SurfingIEEE2009 Third International Conference on Emerging Security Information, Systems and Technologies (Year: 2009).*
International Preliminary Report on Patentability received for PCT Application No. PCT/CN2015/092228 dated May 3, 2018, 5 pages.
International Search Report received for PCT Application No. PCT/CN2015/092228 dated Jul. 14, 2016, 4 pages.
International Written Opinion received for PCT Application No. PCT/CN2015/092228, dated Jul. 14, 2016, 4 pages.

* cited by examiner

PASSWORD SPYING PROTECTION SYSTEM

CLAIM OF PRIORITY

This Application is a U.S. National Stage Filing under 35 U.S.C. 371 from International Application No. PCT/CN2015/092228, filed on 19 Oct. 2015, and published as WO 2017/066914 on 27 Apr. 2017, which Application and Publication are incorporated by reference herein in their entirety.

TECHNICAL FIELD

Embodiments of the present disclosure relate generally security and, more particularly, but not by way of limitation, to password spying protection.

BACKGROUND

Conventionally, mobile devices are often equipped with a password to prevent unauthorized use of, or access to, the devices. However, known methods of entering simple passwords are easily spied on by surrounding people or devices in public areas. Password protection methods involving randomly ordered sets of patterns or colors may allow an authorized user to be authenticated by noting and selecting background patterns or colors associated with a password. Although hidden rules are used for added security, such methods may not be user-friendly and may be complex and time-consuming. Password protection methods involving alternative virtual keypad layouts may still allow spying people or devices to decipher a password by monitoring matching rules used.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

In various example embodiments, a first pattern of characters (e.g., symbols or other selectable elements having values corresponding to data values) is presented on a user interface. A user input is received, wherein the user input is a selection of one of the characters from the pattern of characters. In response to receiving the user input, the first pattern of characters is replaced by a second pattern of characters. Each pattern of characters may be arranged in any shape (e.g., circle, square, line). Each character is encrypted by a password selection rule (e.g., assign to a character selection a value of a character adjacent in a clockwise, counterclockwise, or diagonal direction from the selected character). The characters of each pattern may be arranged at random. After all user inputs are received and the values of the user inputs are determined from previously stored password selection rules, an input password is generated, comprising the user inputs. The generated input password is compared to a previously stored password designation to determine whether the input password matches the stored password designation. The stored password designation may be a user-defined password. If the input password matches the stored password designation, the user is authorized to have access to the user device or any one of the functions of the user device.

Figure 1:
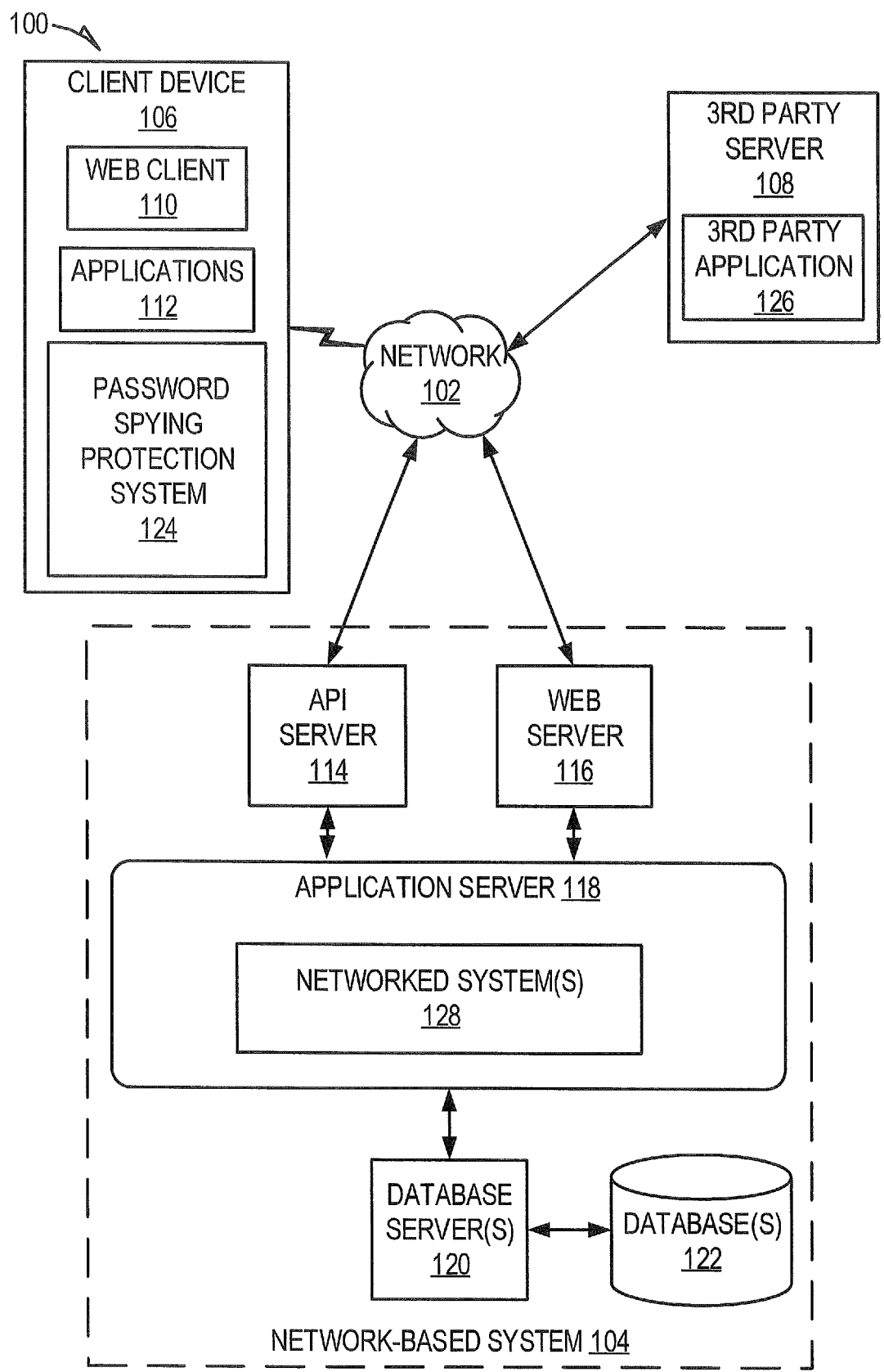
FIG. 1 is a network diagram illustrating a network environment suitable for facilitating password spying protection, according to some example embodiments.

FIG. 1 is a network diagram illustrating a network system 100 suitable for facilitating a method of password spying protection having a client-server architecture configured for exchanging data over a network 102, according to one embodiment. While the network system 100 is depicted as having a client-server architecture, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 1. Moreover, it shall be appreciated that although the various functional components of the network system 100 are discussed in the singular sense, multiple instances of any one of the various functional components may be employed.

The network system 100 includes a network-based system 104 in communication with a client device 106 and a third party server 108. In one embodiment, the network-based system 104 may be a network-based marketplace (e.g., eBay.com). The network-based system 104 communicates and exchanges data within the network system 100 that pertain to various functions and aspects associated with the network system 100 and its users. The network-based system 104 may provide server-side functionality, via the network 102 (e.g., the Internet), to network devices such as the client device 106.

The client device 106 may comprise, but is not limited to, a mobile phone, desktop computer, laptop, portable digital assistant (PDA), smart phone, tablet, ultra book, netbook, multi-processor system, microprocessor-based or programmable consumer electronic, game console, set-top boxes, or any other communication device that a user may utilize to access the network-based system 104. In some embodiments, the client device 106 may comprise a display module (not shown) to display information (e.g., in the form of user interfaces). In further embodiments, the client device 106 may comprise one or more of touch screens for receiving user inputs, accelerometers, gyroscopes, cameras, microphones, global positioning system (GPS) devices, and so forth. The client device 106 may be a device of a user that is used to perform a transaction involving digital items within the network-based system 104.

The client device 106 may be operated by users who use the network system 100 to exchange data over the network 102. These data exchanges include transmitting, receiving (communicating), and processing data to, from, and regarding content and users of the network system 100. The data may include, but are not limited to, images; video or audio content; user preferences; product and service feedback, advice, and reviews; product, service, manufacturer, and vendor recommendations and identifiers; product and service listings associated with buyers and sellers; product and service advertisements; auction bids; transaction data; user profile data; and social data, among other things.

The client device 106 interfaces with the network-based system 104 via a connection with the network 102. Depending on the form of the client device 106, any of a variety of types of connections and networks 102 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 102 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 102 may be a Wireless Fidelity (Wi-Fi, IEEE 802.11x type) connection, a Worldwide Interoperability for Microwave Access (WiMAX) connection, or another type of wireless data connection. In such an embodiment, the network 102 may include one or more wireless access points coupled to a local area network (LAN), a wide area network (WAN), the Internet, or another packet-switched data network. In yet another example, the connection to the network 102 may be a wired connection (e.g., an Ethernet link), and the network 102 may be a LAN, a WAN, the Internet, or another packet-switched data network. Accordingly, a variety of different configurations are expressly contemplated.

In various embodiments, the data exchanged within the network system 100 may be dependent upon user-selected functions available through one or more client or user interfaces (UIs). The UIs may be associated with a client device, such as the client device 106 executing a web client 110 (e.g., an Internet browser), which may be in communication with the network-based system 104. The UIs may also be associated with one or more applications 112 executing on the client device 106, such as a mobile application designed for interacting with the network-based system 104 or with a social network platform hosted by the third party server 108. In one embodiment, a password spying protection system 124 operates within the client device 106 and may be in communication with the network-based system 104 through the network 102.

Turning specifically to the network-based system 104, an application programming interface (API) server 114 and a web server 116 are coupled to, and provide programmatic and web interfaces respectively to, an application server 118. As illustrated in FIG. 1, the application server 118 may be coupled via the API server 114 and the web server 116 to the network 102, for example, via wired or wireless interfaces. The application server 118 is, in turn, shown to be coupled to a database server 120 that facilitates access to a database 122. In some examples, the application server 118 can access the database 122 directly without the need for the database server 120. The database 122 may include multiple databases that may be internal or external to the network-based system 104.

The application server 118 may, for example, host one or more applications that provide a number of content publishing and viewing functions and services to users who access the network-based system 104. For example, the network-based system 104 may host a marketplace application that provides a number of marketplace functions and services to users, such as publishing, listing, and price-setting mechanisms whereby a seller may list (or publish information concerning) goods or services (also collectively referred to as "products") for sale, a buyer can express interest in or indicate a desire to purchase such goods or services, and a price can be set for a transaction pertaining to the goods or services. The marketplace application may also provide a payment system(s) that includes a number of functions to perform or facilitate payments and transactions.

The database 122 stores data pertaining to various functions and aspects associated with the network system 100 and its users. For example, the database 122 stores and maintains user profiles for users of the network-based system 104. Each user profile comprises user profile data that describes aspects of a particular user. The user profile data may, for example, include demographic data, user preferences, social data, and financial information. The demographic data may, for example, include information describing one or more characteristics of a user, such as gender, age, location information (e.g., hometown or current location), employment history, education history, contact information, familial relations, or user interests. The financial information may, for example, include private financial information of the user, such as account number, credential, password, device identifier, user name, phone number, credit card information, bank information, transaction history, or other financial information which may be used to facilitate online transactions by the user.

The database 122 may also store data values comprising password designations and password selection rules, which may be included in the user profile data. Such values may be specified as data within the password spying protection system 124 as part of user profile data stored on the client device 106. A password designation may be a combination of characters that when received by a user of a device will unlock a device. Additionally, such values may be specified as part of the user profile data stored in a user profile of a user of the network-based system 104. The password spying protection system 124 may access the stored password designations and password selection rules from the database 122 during operation. While the password spying protection system 124 is shown to be embodied on the client device 106, alternative embodiments may include the password spying protection system 124 at the network-based system 104. Further details of the operation of the password spying protection system 124 are described herein with respect to FIG. 3 through FIG. 6.

FIG. 1 also illustrates a third party application 126 executing on the third party server 108 that may offer information or services to the application server 118 or to users of the client device 106. The third party application 126 has programmatic access to the network-based system 104 via a programmatic interface provided by the API server 114. The third party application 126 is associated with any organization that may conduct transactions with or provide services to the application server 118 or to users of the client device 106. For example, the third party application 126 may be associated with a network-based social network platform (e.g., Facebook®, Twitter®, Google+®, Pinterest®, LinkedIn®, or the like) that may provide a platform for members to build and maintain social networks and relations among members.

Figure 2:
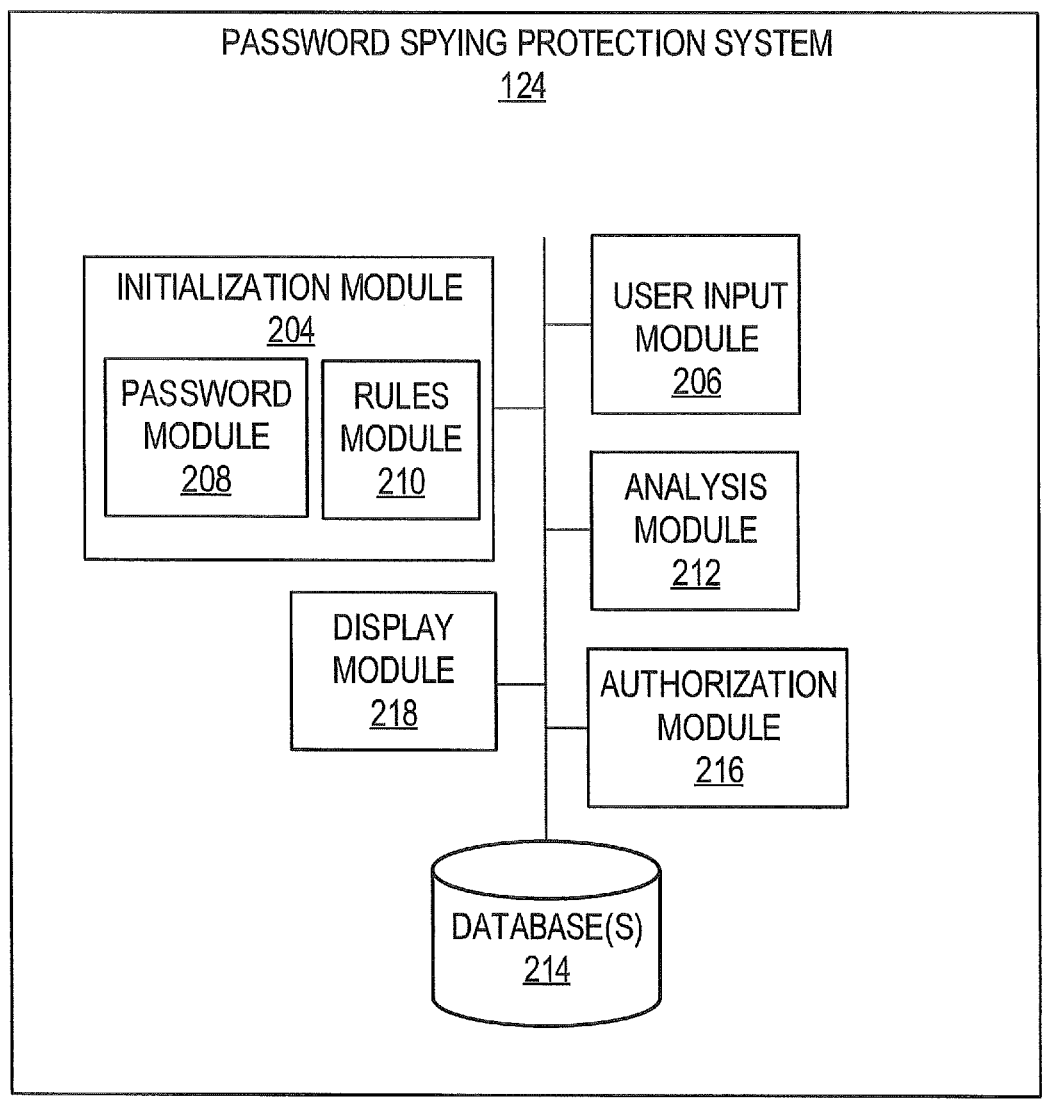
FIG. 2 is a block diagram illustrating various functional modules of a password spying protection system, according to some example embodiments.

FIG. 2 is a block diagram illustrating functional components of the password spying protection system 124, according to some example embodiments. Various functional modules are shown for the password spying protection system 124, consistent with some embodiments. The password spying protection system 124 is shown as including an initialization module 204, a user input module 206, an analysis module 212, a database 214, an authorization module 216, and a display module 218. Additionally, the initialization module 204 includes a password module 208 and a rules module 210. The initialization module 204, the user input module 206, the analysis module 212, the database 214, the authorization module 216, and the display module 218 may all be configured to communicate with each other (e.g., via a bus, shared memory, a switch, or APIs). The various modules of the password spying protection system 124 may, furthermore, access the database 122 via the database servers 120 through the network 102, and each of the various modules of the password spying protection system 124 may be in communication with one or more of the third party applications 126 (e.g., a social network platform). While the database 214 is shown to be a part of the password spying protection system 124, in an alternative embodiment, the database 214 may be coupled to the password spying protection system 124. Further, while the modules of FIG. 2 are discussed in the singular sense, it will be appreciated that in other embodiments multiple modules may be employed.

The initialization module 204 is configured to initialize the password spying protection system 124 by generating a user interface for presentation on a user device (e.g., client device 106). The user interface includes perceptible user interface elements allowing display of a pattern of a plurality of characters. Further details and embodiments of the user interface are described herein with respect to FIG. 7 through FIG. 10.

The password module 208 is configured to receive a password designation (e.g., including characters comprising a password that are chosen by a user) and store the password designation in the database (e.g., database 122, database 214). The characters included in a password designation may be symbols (e.g., alphanumeric symbols, punctuation, shapes, and objects) or other selectable elements having values corresponding to data values (e.g., a selectable element on the client device 106 corresponding to a data value designating a location on the client device screen).

The rules module 210 is configured to receive password selection rules from a user and store the password selection rules in the database (e.g., database 122, database 214). Password selection rules may, for example, include a counterclockwise rule (e.g., the input value of a received user input is determined to be the value of the character that is counterclockwise in orientation from the character actually selected by the user). Password selection rules may also include, for example, determining an input value based on a neighboring character in a clockwise orientation or a diagonal orientation. An input value may also be determined based on a combination of password selection rules.

The user input module 206 is configured to receive user input through the user interface of the client device (e.g., client device 106). The user input that the user input module 206 receives may include a password designation, password selection rules, or a user inputs during a login process. The user input module 206 is also configured to determine the input value of the user input based on a password selection rule.

The analysis module 212 is configured to generate an input password from a series of user inputs (e.g., a first and a second user input) based on the determination of the input values of the series of user inputs by the user input module 206. The analysis module 212 is also configured to compare the generated input password to a stored password designation in the database (e.g., database 122, database 214). By comparing the input password to the stored password designation, the analysis module 212 determines whether there is a match between the data values representing the input password and the data values representing the stored password designation.

The authorization module 216 is configured to provide authorization to a user of the user device based on the input password matching the stored password designation. Such authorization permits the user to use the client device or any one of the functions of the client device (e.g., applications). In some embodiments, providing authorization to a user may include transmission of an authorization token to the network-based system 104.

The display module 218 is configured to provide the user interface for display on the client device, including perceptible user interface elements. The perceptible user interface elements are patterns of characters displayed on the user interface. The patterns of characters may be aligned on the user interface in any arrangement or shape (e.g., circle, square, grid, star). Characters, for example, may include symbols (e.g., alphanumeric symbols, punctuation, shapes, and objects) or other selectable elements having values corresponding to data values (e.g., a selectable element on the user device corresponding to a data value designating a location on the user device screen). Patterns of characters for display on the user interface may not be limited to such symbols or other selectable elements and may include any form of perceptible user interface elements, such that the user is able to recognize that one perceptible user interface element is different from another.

Figure 3:
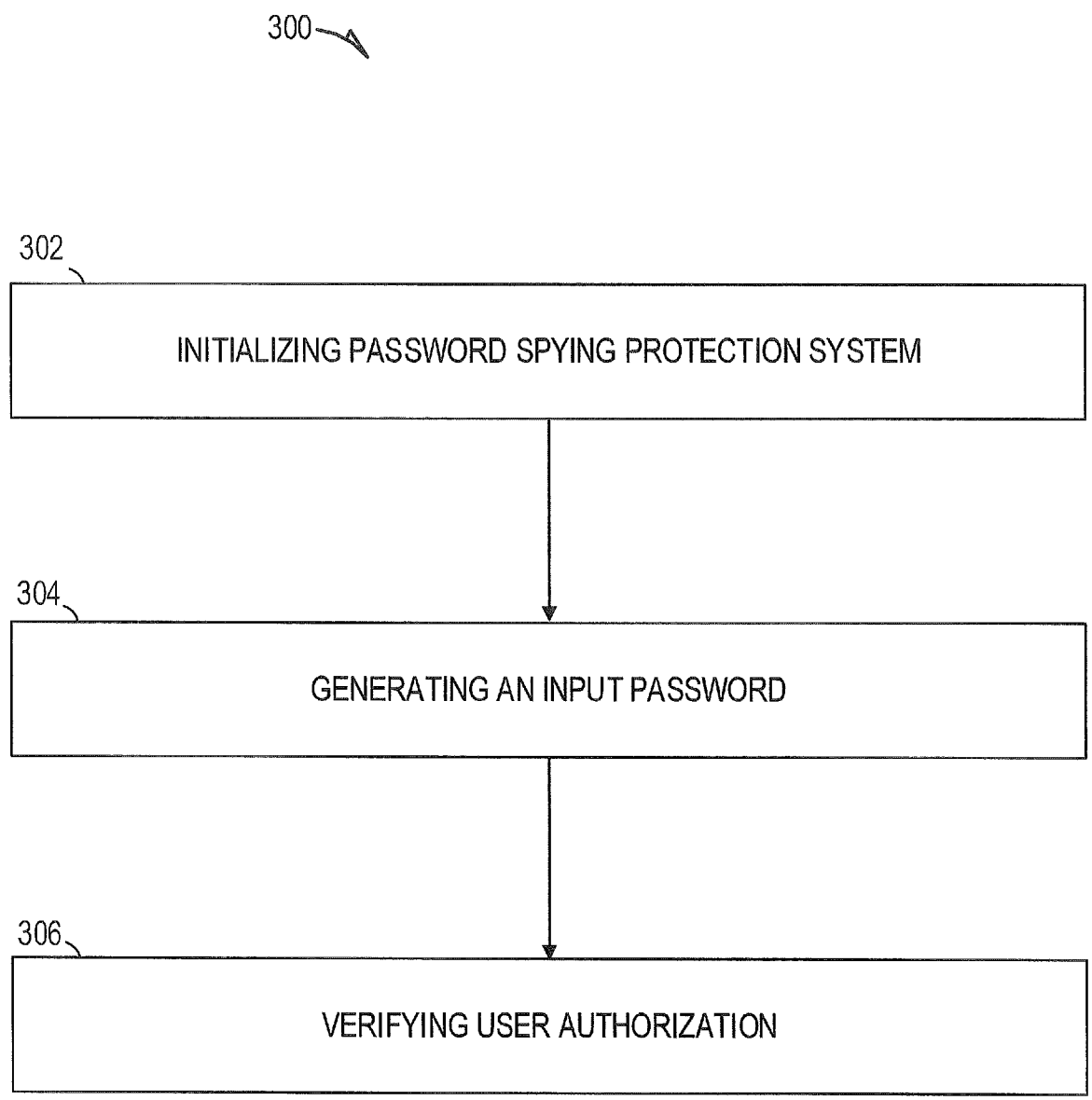
FIG. 3 is a flowchart illustrating operations of a device in performing a method for password spying protection, according to some example embodiments.

FIG. 3 is a flowchart illustrating operations of a client device in performing a method 300 for password spying protection, according to some example embodiments. The method 300 includes initialization of the password spying protection system 124 (operation 302), generation of an input password (operation 304), and verification of user authorization (operation 306). At operation 302, the password spying protection system 124 is initialized.

Figure 4:
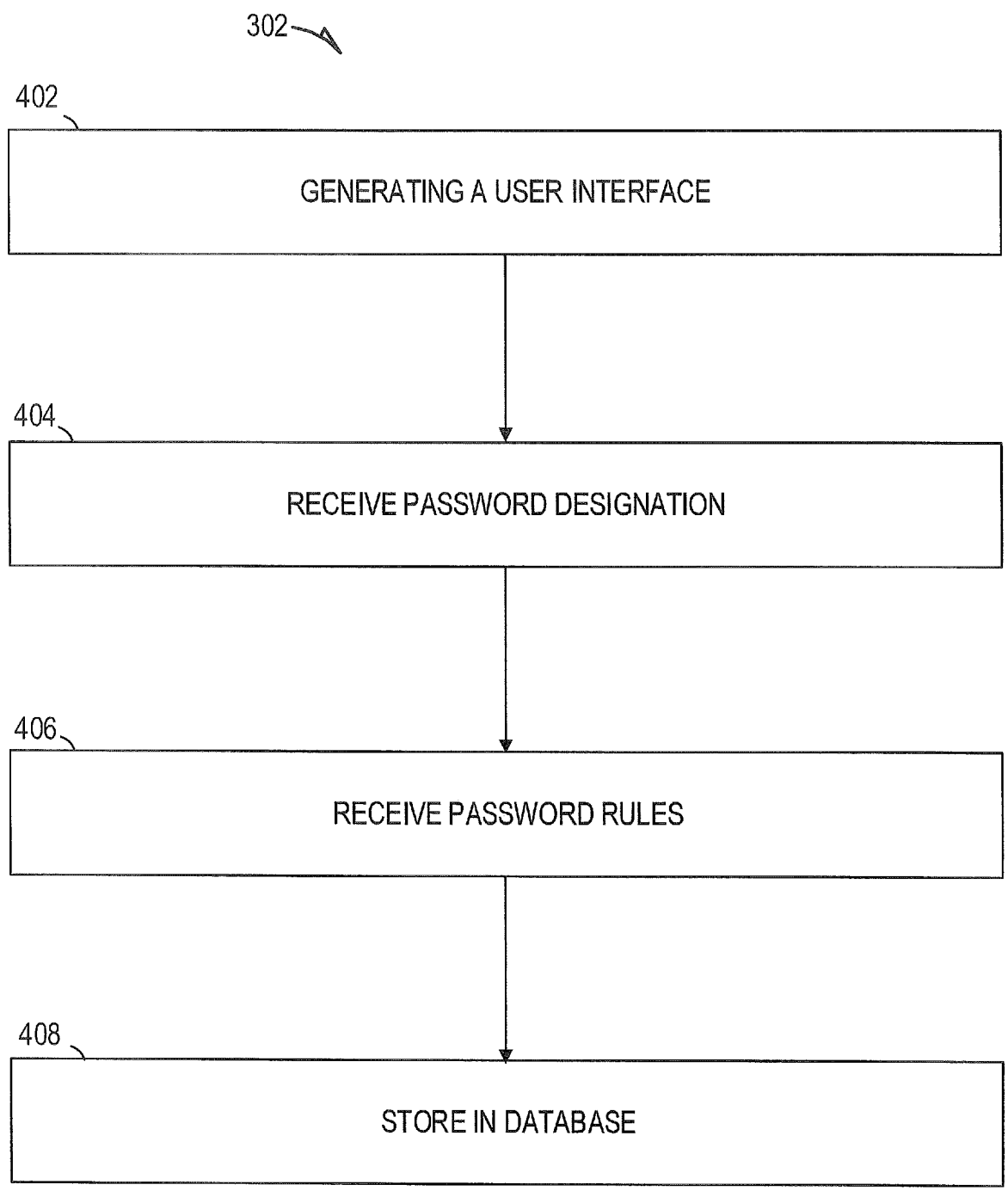
FIG. 4 is a flowchart illustrating operations of a device in performing a method for password spying protection, according to some example embodiments.

Turning to FIG. 4, initialization of the password spying protection system 124 at operation 302 includes generating a user interface (operation 402), receiving a password designation from a user (operation 404), receiving a password selection rule from a user (operation 406), and storing these values in the database (e.g., database 122, database 214) (operation 408). At operation 402, the password spying protection system 124 (e.g., the display module 218) generates a user interface for presentation on the client device, including perceptible user interface elements that displays a pattern of characters on the client device. The pattern of characters displayed on the user interface is utilized at least for receiving user inputs. In some embodiments, the patterns of characters displayed on the user interface are also utilized for receiving password designations and password selection rules.

At operation 404, the password spying protection system 124 (e.g., the password module 208) receives from a user a password designation. The password designation may be a combination of characters that when received by a user of a device will unlock a device The password designation received may include a series of user inputs (e.g., character selections) including symbols (e.g., alphanumeric symbols, punctuation, shapes, and objects) or other selectable elements having values corresponding to data values.

At operation 406, the password spying protection system 124 (e.g., the rules module 210) receives from a user a password selection rule, including a specification of a rule to apply in assigning a value to a received user input. For example, a user may create a password selection rule that assigns as a value to a user input the value of a character adjacent in a clockwise position from the chosen character by the user. A password selection rule may also assign as a value to a user input the value of a character adjacent in a counterclockwise position or in a diagonal position from the chosen character by the user. Characters in adjacent positions to the chosen character by the user may not necessarily be directly adjacent and may also be a number of positions removed from the chosen character, for example a character three positions to the right or to the left of a chosen character.

The user may define more than one password selection rule for application to user inputs. In some embodiments, a separate password selection rule may be defined by the user and applied. These values may be accessed by the password spying protection system 124 in determining the value of the first user input. For example, a password selection rule specifies that the password spying protection system 124 assign to the user input the value of the character adjacent in a clockwise position from the character selected by the user. In other embodiments, the password selection rule specifies that the value of the character adjacent in a counterclockwise position or a diagonal position to the character selected by the user be assigned as the user input value. In some embodiments, the value of the character selected by the user is the actual value assigned as the user input value.

At operation 408, the password spying protection system 124 stores the password designation and the password selection rule in the database (e.g., database 122, database 214).

Figure 5:
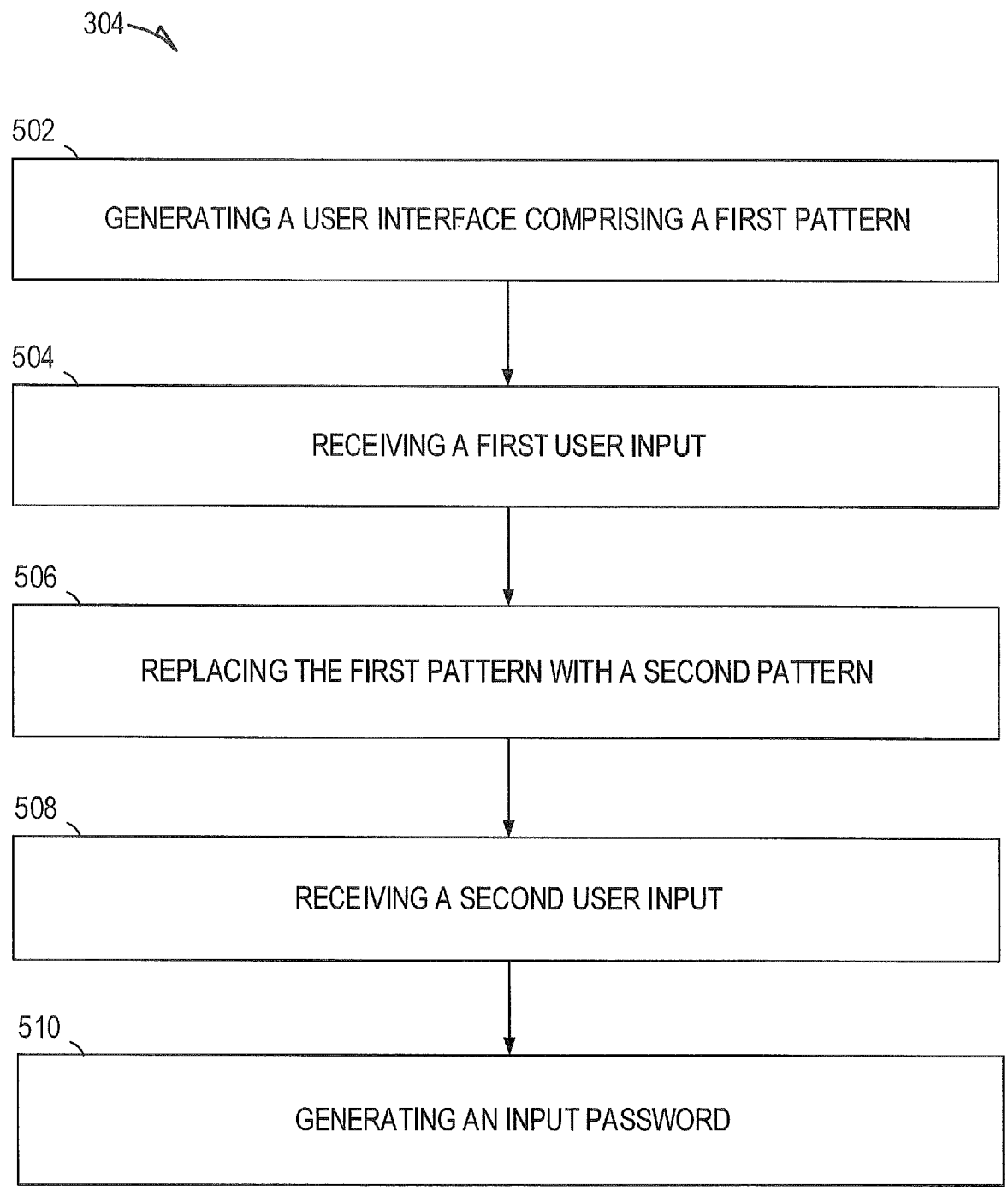
FIG. 5 is a flowchart illustrating operations of a device in performing a method for password spying protection, according to some example embodiments.

Returning to FIG. 3, the password spying protection system 124 generates an input password at operation 304. FIG. 5 provides a more detailed discussion of operation 304. Operation 304 includes generating a user interface comprising a first pattern (operation 502), receiving a first user input (operation 504), replacing the first pattern with a second pattern (operation 506), receiving a second user input (operation 508), and generating an input password (operation 510).

At operation 502, the password spying protection system 124 (e.g., the display module 218) generates a user interface for presentation on the client device, including perceptible user interface elements allowing for display of a pattern of characters on the client device. The user interface is initially comprised of a first pattern of a plurality of characters. The first pattern of characters may be in any shape (e.g., circle, square, line) and may include symbols or other selectable elements, and the characters may be displayed in a random order.

At operation 504, the password spying protection system 124 (e.g., user input module 206) receives a first user input that includes a selection of one of the characters of the plurality of characters in the first pattern. The password spying protection system 124 utilizes the selected character and applies the password selection rule defined by the user in order to determine a value corresponding to the first user input to be included in the generation of the input password. The password selection rule is defined by the user at operation 406 during initialization of the password spying protection system 124, and the data values comprising the password selection rule may be stored in the database 122 or the database 214.

At operation 506, in response to receiving the first user input, the password spying protection system 124 (e.g., the display module 218) replaces the first pattern displayed on the user interface with a second pattern of a plurality of characters. In one embodiment, the position of the second pattern of the plurality of characters displayed on the user interface is dependent on a position of the character previously selected from the first pattern of the plurality of characters by the user. For example, the second pattern of the plurality of characters may be centered at the position on the user interface where the previously selected character was positioned. The second pattern of the plurality of characters may also, as described above with respect to the first pattern, be in any shape and include symbols or other selectable elements, and the characters of the second pattern may be displayed in a random order.

At operation 508, a second user input is received that includes a selection of a character from the second pattern of the plurality of characters. As with the first pattern, the password spying protection system 124 utilizes the selected character and applies the password selection rule defined by the user in order to determine a value corresponding to the second user input to be included in the generation of the input password. The password spying protection system 124 may utilize the same password selection rule defined by the user for the second user input as was used for the first user input, or may use a different password selection rule defined by the user in determining the value of the second user input. For example, the password spying protection system 124 may use a password selection rule that determines the value corresponding to the received first user input that is a character adjacent in a clockwise position from the selected character of the first pattern, and a password selection rule that determines the value corresponding to the received second user input that is a character adjacent in a counter-clockwise position from the selected character of the second pattern.

At operation 510, the password spying protection system 124 (e.g., the password module 208) generates an input password. The input password is comprised of at least the value corresponding to the first user input and value corresponding to the second user input. The values corresponding to the first user input and the second user input included in the input password are the values determined in operations 504 and 508, respectively. It is noted that more user inputs may be received depending on a length of the password designation. For example, if the password designation is five characters long, then the password spying protection system 124 will receive five user inputs.

Figure 6:
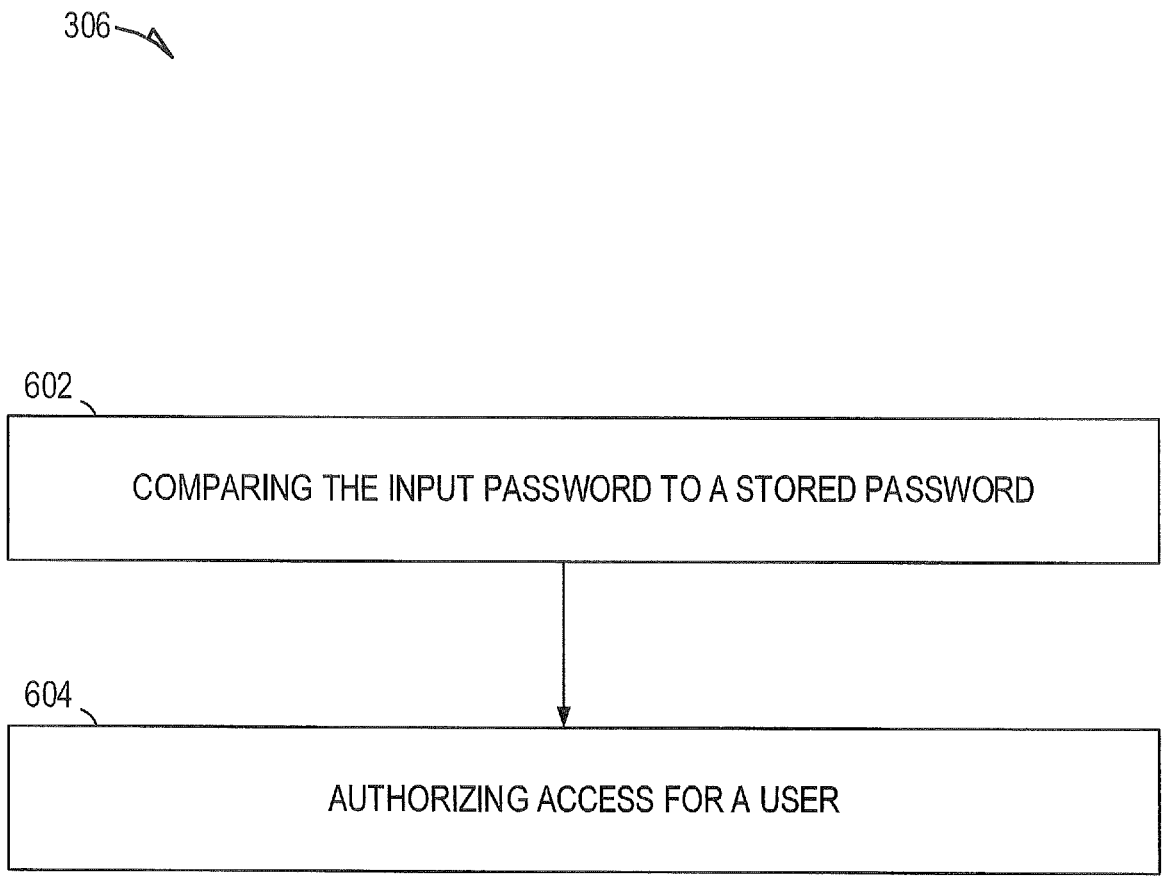
FIG. 6 is a flowchart illustrating operations of a device in performing a method for password spying protection, according to some example embodiments.

Returning to FIG. 3, at operation 306, the password spying protection system 124 verifies that the user is authorized to have access to the user device (e.g., the client device 106). Operation 306 is discussed in more detail in connection with FIG. 6. Turning to FIG. 6, verifying that the user is authorized to have access to the user device includes comparing the generated input password to a stored password designation (operation 602) and authorizing access for the user (operation 604). At operation 602, the password spying protection system 124 (e.g., the analysis module 212) uses the input password generated at operation 510 and compares the generated password to the stored password designation (e.g., the password designation created by the user at operation 404). In one embodiment, the stored password designation and the generated input password are saved in the database (e.g., database 122, database 214), and the password spying protection system 124 accesses the database to compare the input password to the stored password designation.

At operation 604, the user is authorized to access the client device (e.g., the client device 106) when the password spying protection system 124 (e.g., the analysis module 212) verifies that the generated input password matches the stored password designation. In being authorized, the user is permitted to use the client device and may be authorized to use any one of the functions of the client device (e.g., applications). In some embodiments, providing authorization to the user may include transmission of an authorization token to the network-based system 104, allowing authorization of the user to use any one of the application(s) associated with the network-based system 104.

Figure 7:
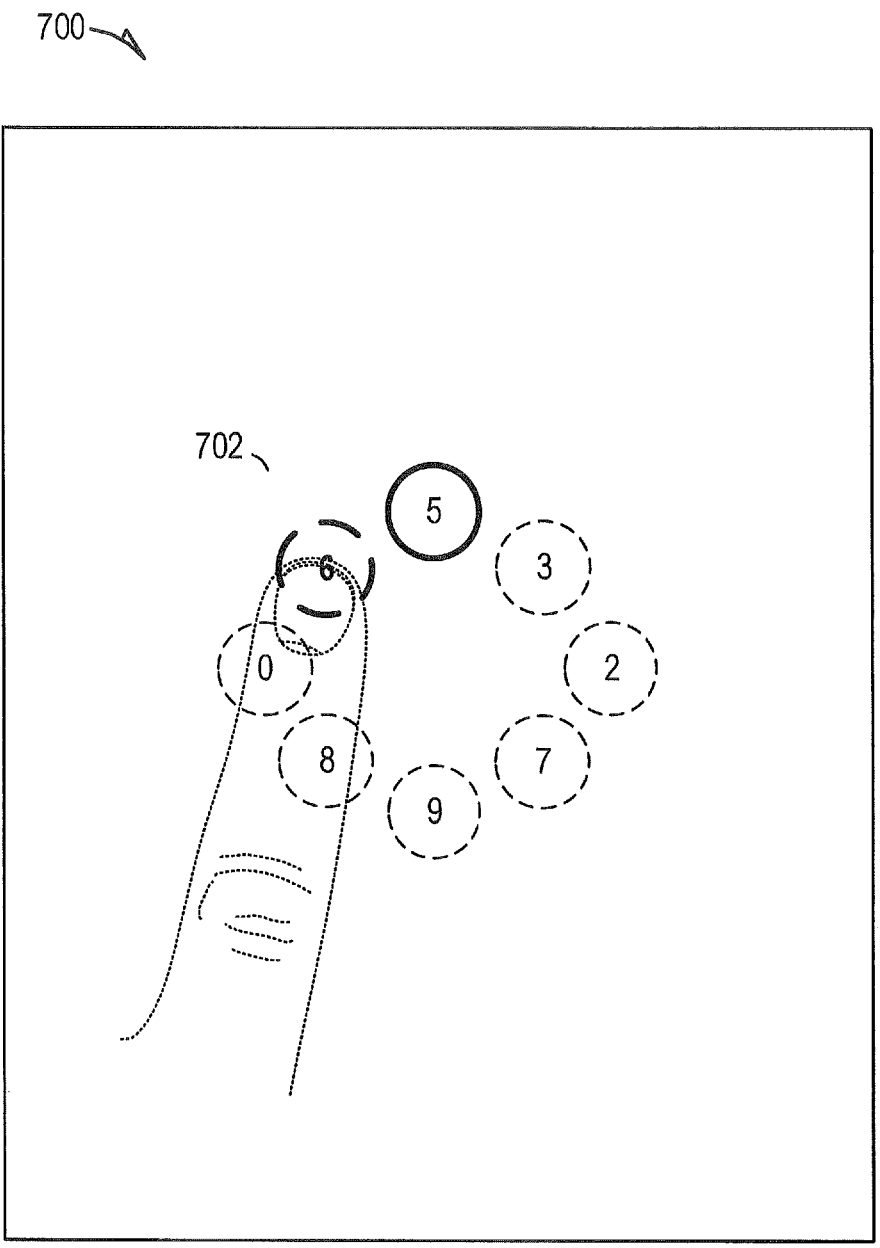
FIG. 7 is an interface diagram illustrating operations of an example embodiment of a password spying protection system, consistent with some embodiments.

FIG. 7 is an interface diagram illustrating operations of an example embodiment of the password spying protection system 124, consistent with some embodiments. As shown in FIG. 7, a user interface 700 is displayed on a client device that comprises a first pattern of a plurality of characters 702. In the example embodiment, the first pattern of the plurality of characters 702 is displayed in a circular pattern, and the characters are ordered at random. In this example, the stored password designation is "5542", and the password selection rule is to assign to the user input the value of the character adjacent in a clockwise position from the character selected by a user. In FIG. 7, the user selects the character "6" as the first user input, and the password spying protection system 124 assigns to the first user input the value "5," according to the password selection rule, because the character "5" is the character adjacent in a clockwise position from the character selected by the user (character "6").

Figure 8:
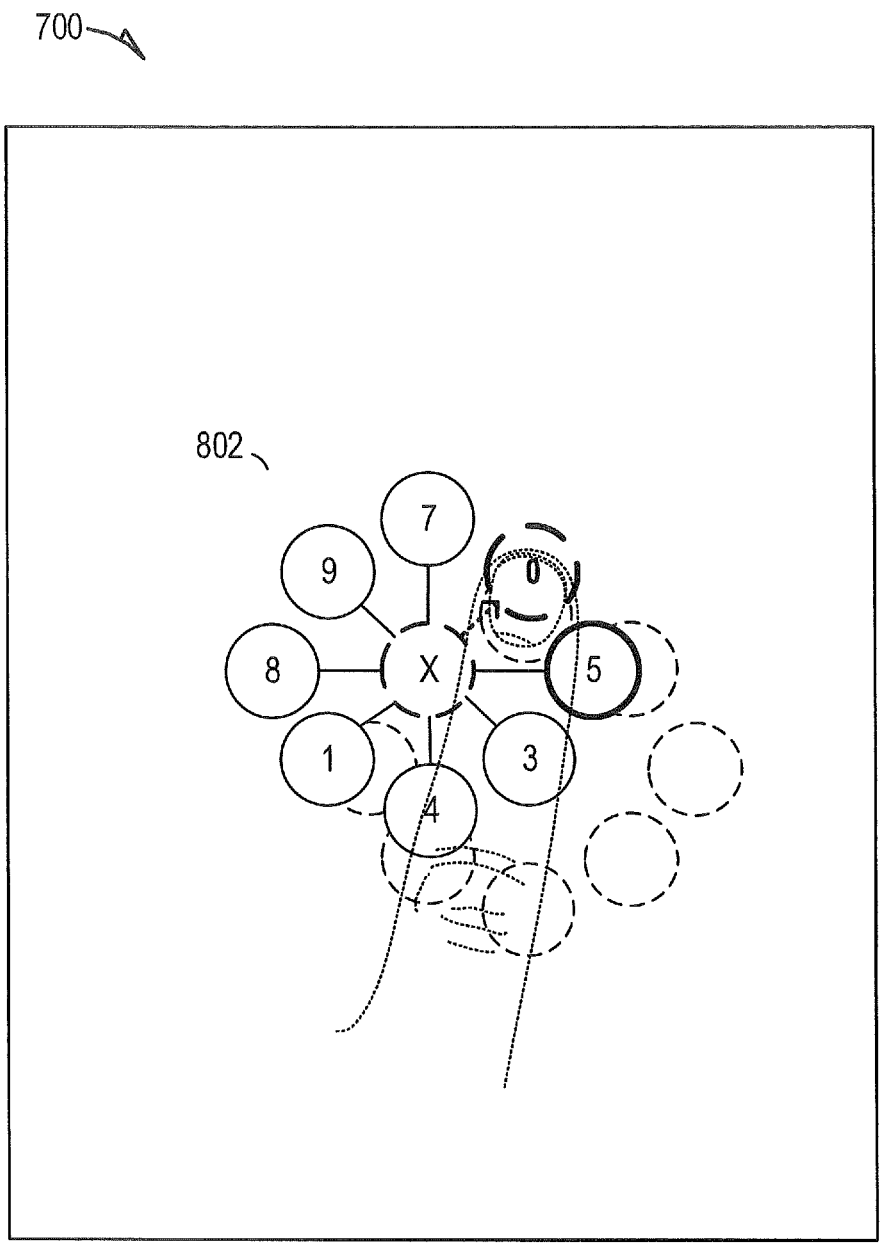
FIG. 8 is an interface diagram illustrating operations of an example embodiment of a password spying protection system, consistent with some embodiments.

FIG. 8 is an interface diagram illustrating operations of an example embodiment of the password spying protection system 124 after the selection of the first user input (e.g., the user interface displaying a second pattern of a plurality of characters). As shown in FIG. 8, the first pattern of the plurality of characters on the user interface 700 is replaced by a second pattern of a plurality of characters 802. The second pattern of the plurality of characters 802 comprises a different set of characters from the first pattern 702, and the position of the second pattern 802 is dependent upon the first user input (e.g., the location of the character selected from the first pattern 702, the character "6," became the location upon which the second pattern 802 is centered). Similar to the first pattern 702, the second pattern 802 is also comprised of a plurality of characters ordered at random. In FIG. 8, the user selects the character "0" as the second user input and the password spying protection system 124 assigns to the second user input the value "5," according to the password selection rule, because the character "5" is the character adjacent in a clockwise position from the character selected by the user (character "0").

It is noted that in alternative embodiments, the location upon which the second pattern 802 is centered may be at a different location than that of the previous user input. Additionally, the plurality of characters of the second pattern 802 may comprise a same set of characters as the first pattern 702.

Figure 9:
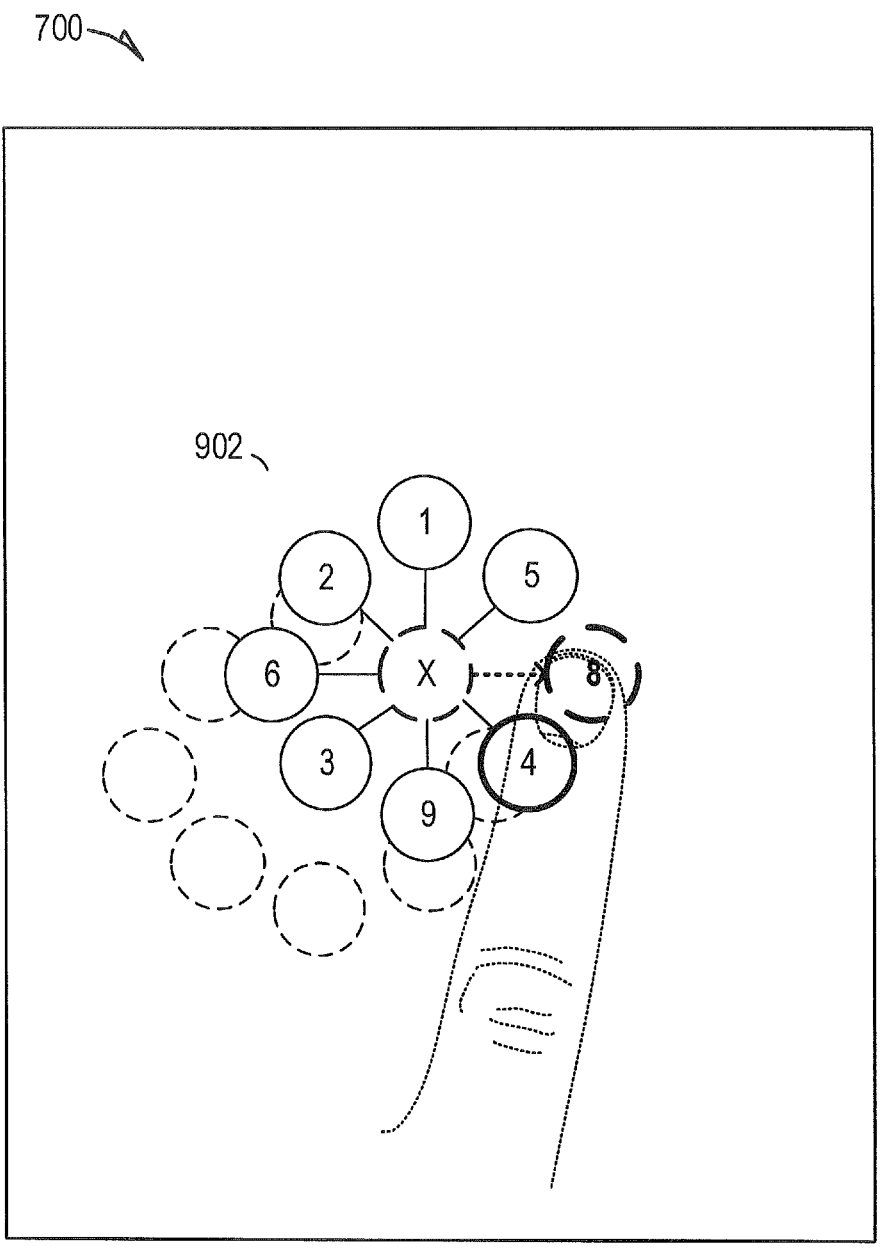
FIG. 9 is an interface diagram illustrating operations of an example embodiment of a password spying protection system, consistent with some embodiments.

FIG. 9 is an interface diagram illustrating operations of an example embodiment of the password spying protection system 124 after the selection of the second user input (e.g., the user interface displaying a third pattern of a plurality of characters). As shown in FIG. 9, the second pattern of the plurality of characters 802 on the user interface 700 is replaced by a third pattern of a plurality of characters 902. The third pattern of the plurality of characters 902 comprises a different set of characters from the second pattern 802, and the position of the third pattern 902 is dependent upon the second user input (e.g., the location of the character selected from the second pattern 802, the character "0," became the location upon which the third pattern 902 is centered). Similar to the second pattern 802, the third pattern 902 is also comprised of a plurality of characters ordered at random. In FIG. 9, the user selects the character "8" as the third user input and the password spying protection system 124 assigns to the third user input the value "4," according to the password selection rule, because the character "4" is the character adjacent in a clockwise position from the character selected by the user (character "8").

It is noted that in alternative embodiments, the location upon which the third pattern 902 is centered may be at a different location than that of the previous user input. Additionally, the plurality of characters of the third pattern 902 may comprise a same set of characters as the second pattern 802.

Figure 10:
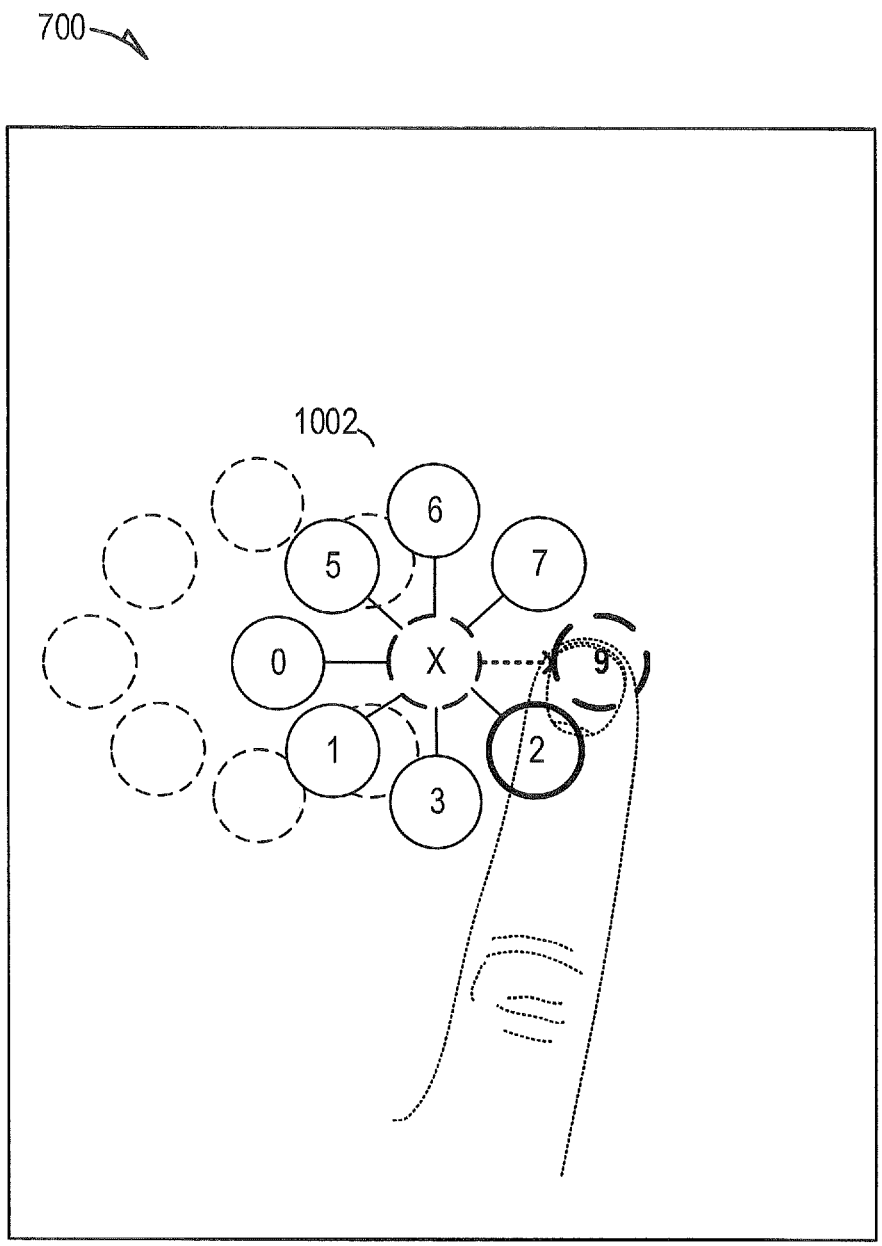
FIG. 10 is an interface diagram illustrating operations of an example embodiment of a password spying protection system, consistent with some embodiments.

FIG. 10 is an interface diagram illustrating operations of an example embodiment of the password spying protection system 124 after the selection of the third user input (e.g., the user interface displaying a fourth pattern of a plurality of characters). As shown in FIG. 10, the third pattern of the plurality of characters 702 on the user interface 700 is replaced by a fourth pattern of a plurality of characters 1002. The fourth pattern of the plurality of characters 1002 comprises a different set of characters from the third pattern 902, and the position of the fourth pattern 1002 is dependent upon the third user input (e.g., the location of the character selected from the third pattern 902, the character "8," became the location upon which the fourth pattern 1002 is centered). Similar to the third pattern 902, the fourth pattern 1002 is also comprised of a plurality of characters ordered at random. In FIG. 10, the user selects the character "9" as the fourth user input and the password spying protection system 124 assigns to the fourth user input the value "2," according to the password selection rule, because the character "2" is the character adjacent in a clockwise position from the character selected by the user (character "9").

It is noted that in alternative embodiments, the location upon which the fourth pattern 1002 is centered may be at a different location than that of the previous user input. Additionally, the plurality of characters of the fourth pattern 1002 may comprise a same set of characters as the third pattern 902.

After receiving all user inputs (e.g., selections of characters) and determining the values of the user inputs, the password spying protection system 124 (e.g., analysis module 212) generates the input password comprising the values of the first user input through the fourth user input (e.g., the input password is "5542"). The password spying protection system 124 may store the input password in the database (e.g., database 122, database 214). The password spying protection system 124 compares the generated input password to the stored password designation in the database to determine whether the input password matches the stored password designation. In the example embodiment, because the generated input password (e.g., input password "5542") is equal to the stored password designation (e.g., stored password designation "5542"), the user is granted authorization/access. Authorization allows the user to utilize the client device (e.g., client device 106), any function of the client device (e.g., applications), or any application associated with the network-based system 104.

Figure 11:
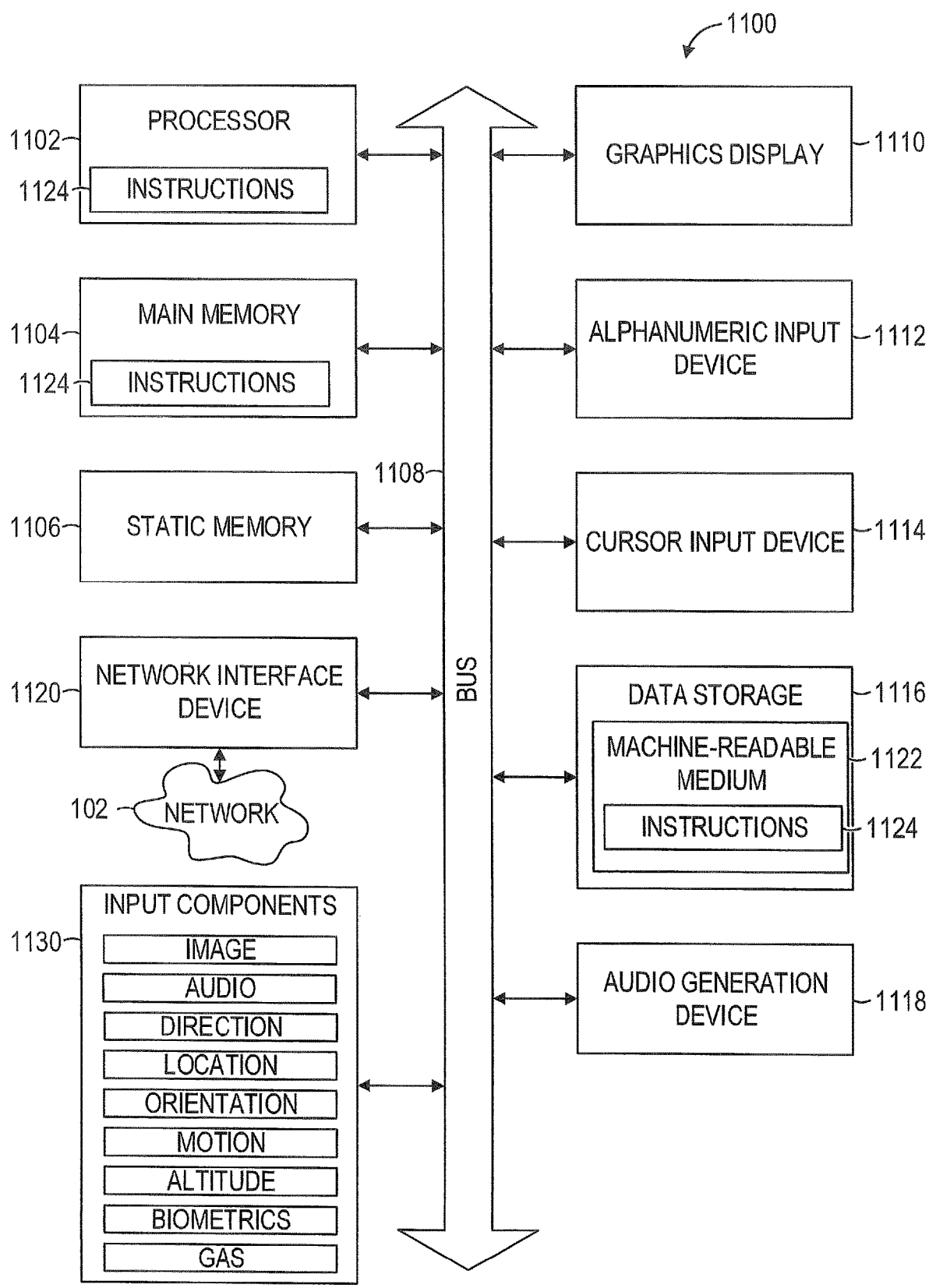
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine 1100 is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 contains solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1100 with at least the processor 1102, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor input device 1114 (e.g., a mouse, a touchpad, a trackball, a joystick, a motion sensor, an eye tracking device, or another pointing instrument), a data storage 1116, an audio generation device 1118 (e.g., a sound card, an amplifier, a speaker, a headphone jack, or any suitable combination thereof), and a network interface device 1120.

The data storage 1116 (e.g., a data storage device) includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 102 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device (e.g., a smart phone, tablet computer, or a wearable device), and have one or more additional input components 1130 (e.g., sensors or gauges). Examples of such input components 1130 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components 1130 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1124 for execution by the machine 1100 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1124).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
generating a user interface to be displayed on a client device, the user interface comprising a first pattern of a plurality of characters, each character of the plurality of characters at a first plurality of character positions centered at a first center position;
receiving a first user input comprising a selection of a first character at a first character position of the first plurality of character positions from the first pattern of the plurality of characters;
determining a value of the first user input received based on the selection of the first character at the first character position and a password selection rule;
in response to receiving the first user input at the first character position, replacing the first pattern of the plurality of characters with a second pattern of a plurality of characters, each character of the plurality of characters at a second plurality of character positions centered at the first character position;
receiving a second user input comprising a selection of a second character at a second character position of the second plurality of character positions from the second pattern of the plurality of characters;
determining a value of the second user input received based on the selection of the second character at the second character position and the password selection rule;
generating an input password comprising at least the value of the first user input and the value of the second user input;
comparing, by one or more hardware processors, the input password to a stored password designation to determine whether the input password and the stored password designation match; and authorizing access for a user of the client device in response to the input password matching the stored password designation.

2. The method of claim 1, wherein the characters of the first pattern of the plurality of characters and the characters of the second pattern of the plurality of characters are each displayed in a random order.

3. The method of claim 1, wherein the second pattern of the plurality of characters comprises a different set of characters from the first pattern of the plurality of characters.

4. The method of claim 1, wherein the password selection rule is to assign to a user input a value of a character of a pattern of the plurality of characters adjacent in a clockwise position from a character selected by the user of a same pattern of the plurality of characters.

5. The method of claim 1, wherein the password selection rule is to assign to a user input a value of a character of the pattern of the plurality of characters adjacent in a counterclockwise position from a character selected by the user of a same pattern of the plurality of characters.

6. The method of claim 1, wherein the password selection rule is to assign to a user input a value of a character of a pattern of the plurality of characters in a diagonal position from a character selected by the user of the same pattern of the plurality of characters.

7. The method of claim 1, further comprising receiving a user input on a capacitive touchscreen, wherein the user selects a character from a pattern of the plurality of characters by touching the capacitive touchscreen.

8. A system comprising:
one or more processors of a machine; and
a machine-readable storage medium embodying instructions that, when executed by the one or more processors of the machine, cause the machine to perform operations comprising:
generating a user interface to be displayed on a user device, the user interface comprising a first pattern of a plurality of characters, each character of the plurality of characters at a first plurality of character positions centered at a first center position;
receiving a first user input comprising a selection of a first character at a first character position of the first plurality of character positions from the first pattern of the plurality of characters;
determining a value of the first user input received based on the selection of the first character at the first character position and a password selection rule;
in response to receiving the first user input at the first character position, replacing the first pattern of the plurality of characters with a second pattern of a plurality of characters, each character of the plurality of characters at a second plurality of character positions centered at the first character position;
receiving a second user input comprising a selection of a second character at a second character position of the second plurality of character positions from the second pattern of the plurality of characters;
determining a value of the second user input received based on the selection of the second character at the second character position and the password selection rule;
generating an input password comprising at least the value of the first user input and the value of the second user input;
comparing, by one or more hardware processors, the input password to a stored password designation to determine whether the input password and the stored password designation match; and
authorizing access for a user of the client device in response to the input password matching the stored password designation.

9. The system of claim 8, wherein the characters of the first pattern of the plurality of characters and the characters of the second pattern of the plurality of characters are each displayed in a random order.

10. The system of claim 8, wherein the second pattern of the plurality of characters comprises a different set of characters from the first pattern of the plurality of characters.

11. The system of claim 8, wherein the password selection rule is to assign to a user input a value of a character of a pattern of the plurality of characters adjacent in a clockwise position from a character selected by the user of the same pattern of the plurality of characters.

12. The system of claim 8, wherein the password selection rule is to assign to a user input a value of a character of a pattern of the plurality of characters adjacent in a counter-clockwise position from a character selected by the user of the same pattern of the plurality of characters.

13. The system of claim 8, wherein the password selection rule is to assign to a user input a value of a character of a pattern of the plurality of characters in a diagonal position from the character selected by the user of the same pattern of the plurality of characters.

14. The system of claim 8, further comprising receiving a user input on a capacitive touchscreen, wherein the user selects a character from a pattern of the plurality of characters by touching the capacitive touchscreen.

15. A non-transitory machine-readable storage medium embodying instructions that, when executed by one or more processors of a machine, cause the machine to perform operations comprising:
generating a user interface to be displayed on a user device, the user interface comprising a first pattern of a plurality of characters, each character of the plurality of characters at a first plurality of character positions centered at a first center position;
receiving a first user input comprising a selection of a first character at a first character position of the first plurality of character positions from the first pattern of the plurality of characters;
determining a value of the first user input received based on the selection of the first character at the first character position and a password selection rule;
in response to receiving the first user input at the first character position, replacing the first pattern of the plurality of characters with a second pattern of a plurality of characters, each character of the plurality of characters at a second plurality of character positions centered at the first character position;
receiving a second user input comprising a selection of a second character at a second character position of the second plurality of character positions from the second pattern of the plurality of characters;
determining a value of the second user input received based on the selection of the second character at the second character position and a password selection rule;
generating an input password comprising at least the value of the first user input and the value of the second user input;
comparing, by one or more hardware processors, the input password to a stored password designation to determine whether the input password and the stored password designation match; and authorizing access for a user of the client device in response to the input password matching the stored password designation.

16. The non-transitory machine-readable storage medium of claim 15, wherein the characters of the first pattern of the plurality of characters and the characters of the second pattern of the plurality of characters are each displayed in a random order.

17. The non-transitory machine-readable storage medium of claim 15, wherein the second pattern of the plurality of characters comprises a different set of characters from the first pattern of the plurality of characters.

* * * * *